(12) United States Patent
Dalsgaard et al.

(10) Patent No.: US 11,746,756 B2
(45) Date of Patent: Sep. 5, 2023

(54) OPERATING A WIND TURBINE DURING SERVICE

(71) Applicant: VESTAS WIND SYSTEMS A/S, Aarhus N (DK)

(72) Inventors: Søren Dalsgaard, Hadsten (DK); Torben Ladegaard Baun, Skødstrup (DK); Keld Hammerum, Hadsten (DK); Torben Petersen, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 92 days.

(21) Appl. No.: 17/266,934

(22) PCT Filed: Jul. 9, 2019

(86) PCT No.: PCT/DK2019/050225
§ 371 (c)(1),
(2) Date: Feb. 8, 2021

(87) PCT Pub. No.: WO2020/030235
PCT Pub. Date: Feb. 13, 2020

(65) Prior Publication Data
US 2021/0301794 A1 Sep. 30, 2021

(30) Foreign Application Priority Data

Aug. 7, 2018 (DK) .......................... PA 2018 70519

(51) Int. Cl.
*F03D 80/50* (2016.01)
*F03D 7/02* (2006.01)
*F03D 1/02* (2006.01)

(52) U.S. Cl.
CPC .............. *F03D 80/50* (2016.05); *F03D 1/02* (2013.01); *F03D 7/0224* (2013.01);
(Continued)

(58) Field of Classification Search
CPC .......... F03D 80/50; F03D 1/02; F03D 7/0224; F03D 7/0264; F03D 7/0276;
(Continued)

(56) References Cited

U.S. PATENT DOCUMENTS 9,062,653 B2 * 6/2015 Brath ...................... F03D 17/00
2009/0224543 A1 * 9/2009 Steudel ................. F03D 7/0224
290/44

(Continued)

FOREIGN PATENT DOCUMENTS

EP   2153061 A2   2/2010
EP   2306005 A2   4/2011
(Continued)

OTHER PUBLICATIONS

Danish Patent and Trademark Office First Technical Examination for Application No. PA 2018 70519 dated Feb. 4, 2019.
(Continued)

*Primary Examiner* — Brian P Wolcott
*Assistant Examiner* — Eric A Lange
(74) *Attorney, Agent, or Firm* — Patterson + Sheridan, LLP

(57) ABSTRACT

A method of operating a wind turbine during a service, wherein the wind turbine comprises at least one rotor-nacelle assembly, the or each rotor-nacelle assembly comprising a rotor; the method comprising: detecting that a service is to be or is being carried out on the wind turbine; and, on detecting that a service is to be or is being carried out on the wind turbine, reducing an operating level of the or each rotor-nacelle assembly.

18 Claims, 4 Drawing Sheets

(52) U.S. Cl.
CPC ......... *F03D 7/0264* (2013.01); *F03D 7/0276* (2013.01); *F05B 2240/37* (2020.08); *F05B 2260/70* (2013.01); *F05B 2270/3201* (2013.01); *F05B 2270/327* (2013.01)

(58) Field of Classification Search
CPC .............. F05B 2240/37; F05B 2260/70; F05B 2270/3201; F05B 2270/327; Y02E 10/72
See application file for complete search history.

(56) References Cited

U.S. PATENT DOCUMENTS

| | | | |
|---|---|---|---|
| 2010/0013227 A1* | 1/2010 | Weitkamp | F03D 7/042 290/44 |
| 2011/0198854 A1* | 8/2011 | Minami | F03D 80/50 290/55 |
| 2012/0070304 A1 | 3/2012 | Nielsen et al. | |
| 2014/0328679 A1 | 11/2014 | Nielsen et al. | |
| 2015/0139797 A1* | 5/2015 | Simonsen | F03D 7/0268 416/9 |
| 2017/0352010 A1 | 12/2017 | Son et al. | |
| 2019/0048851 A1* | 2/2019 | Hoffmann | F03D 80/50 |

FOREIGN PATENT DOCUMENTS

| | | |
|---|---|---|
| WO | 2013182201 A1 | 12/2013 |
| WO | 2017163561 A1 | 9/2017 |
| WO | 2017202944 A1 | 11/2017 |
| WO | 2020030235 A1 | 2/2020 |

OTHER PUBLICATIONS

PCT International Search Report for Application No. PCT/DK2019/050225 dated Sep. 26, 2019.
PCT Written Opinion of the International Searching Authority for Application No. PCT/DK2019/050225 dated Sep. 7, 2019.

* cited by examiner

OPERATING A WIND TURBINE DURING SERVICE

FIELD OF THE INVENTION

This invention relates to a method of operating a wind turbine, and in particular a method of operating a wind turbine during a service of the wind turbine.

BACKGROUND

Wind turbines as known in the art comprise a tower supporting a rotor-nacelle assembly, the rotor-nacelle assembly having a rotor with a number of rotor blades. Over time, wind turbines have become larger in an attempt to reduce the cost price per Mega Watt Hour (MWh) of produced electrical power. As an alternative to larger turbines, the power production per wind turbine tower can also be increased by equipping a wind turbine with multiple rotor-nacelle assemblies having comparatively smaller rotor blades.

During its lifetime, a wind turbine undergoes periodic "services" or maintenance procedures. During such services, the wind turbine is shut down so that maintenance can be carried out on its components, leading to lost power production, and hence financial losses for the operator of the wind turbine.

It is against this background that the invention has been devised.

STATEMENTS OF INVENTION

According to an aspect of the invention, there is provided a method of operating a wind turbine during a service, wherein the wind turbine comprises at least one rotor-nacelle assembly, the or each rotor-nacelle assembly comprising a rotor; the method comprising detecting that a service is to be or is being carried out on a specified rotor-nacelle assembly of the wind turbine by detecting a selection of the specified rotor-nacelle assembly for service, and detecting the presence of personnel in the vicinity of the specified rotor-nacelle assembly; and, on detecting that a service is to be or is being carried out on the wind turbine, reducing an operating level of the or each rotor-nacelle assembly.

On detecting that a service is to be or is being carried out on the wind turbine, the method may further comprise: adjusting at least one protection system of the or each rotor-nacelle assembly.

The method may further comprise: on detecting that a service is to be or is being carried out on a specified rotor-nacelle assembly, inhibiting a system associated with the specified rotor-nacelle assembly.

Detecting the presence of personnel in the vicinity of the specified rotor-nacelle assembly may comprise one or more of: detecting the movement of personnel in the vicinity of the specified rotor-nacelle assembly, detecting the operation of an elevator in the vicinity of the specified rotor-nacelle assembly, and detecting that access has been gained to the specified rotor-nacelle assembly.

Inhibiting a system associated with the specified rotor-nacelle assembly may comprise bringing to an idling mode or immobilising the specified rotor-nacelle assembly.

Detecting that a service is to be or is being carried out on the wind turbine may comprise one or more of: detecting the selection of a maintenance operating mode of the wind turbine, and detecting the presence of personnel in the wind turbine.

Detecting the presence of personnel in the wind turbine may comprise one or more of: detecting the movement of personnel in the wind turbine, detecting the operation of an elevator in the wind turbine, and detecting that access has been gained to the interior of the wind turbine.

Reducing an operating level of the or each rotor-nacelle assembly may comprise derating the power of the or each rotor-nacelle assembly and/or the speed of the rotor of the or each rotor-nacelle assembly.

Adjusting at least one protection system of the or each rotor-nacelle assembly may comprise one or more of: reducing an overspeed threshold of the rotor of the or each rotor-nacelle assembly, reducing a vibration threshold of the or each rotor-nacelle assembly, reducing an overpower threshold of the or each rotor-nacelle assembly, reducing an acceleration threshold of the tower and increasing a blade pitch threshold of the rotor of the or each rotor-nacelle assembly.

The amount by which the overspeed threshold and/or the overpower threshold is reduced may be comparatively greater than the amount which by the operating level of the or each rotor-nacelle assembly is reduced.

Derating the power of the or each rotor-nacelle assembly and/or the speed of the rotor of the or each rotor-nacelle assembly may comprise: selecting a target power for the or each rotor-nacelle assembly and/or a target speed for the rotor of the or each rotor-nacelle assembly, determining a rotational frequency of the rotor corresponding to the target power and/or target speed; determining a whirling mode frequency of a rotor blade of the rotor; determining an upper whirling mode frequency threshold and a lower whirling mode frequency threshold for the rotor blade based on the determined whirling mode frequency, the upper and lower thresholds defining the avoidance zone; determining whether the rotational frequency falls within the avoidance zone; and, on determining that the rotational frequency falls outside the avoidance zone, derating the power of the or each rotor-nacelle assembly to the target power and/or derating the speed of the rotor of the or each rotor-nacelle assembly to the target speed, and on determining that the rotational frequency falls within the avoidance zone, reducing the target power and/or target speed until the rotational frequency associated with the reduced target power and/or reduced target speed falls outside the avoidance zone and derating the power of the or each rotor-nacelle assembly to the sufficiently reduced target power and/or derating the speed of the rotor of the or each rotor-nacelle assembly to the sufficiently reduced target speed.

The method may further comprise: monitoring ambient wind speed; determining a wind speed based on the ambient wind speed; determining whether the wind speed exceeds a wind speed threshold, and on determining that the wind speed exceeds a wind speed threshold, bringing to an idling mode or immobilising the rotor of the or each rotor-nacelle assembly.

The invention extends to a controller for a wind turbine control system comprising a processor and a memory module, wherein the memory module comprises a set of program code instructions which when executed by the processor implement the method referred to above.

The invention extends to a wind turbine comprising the controller referred to above.

The invention extends to a computer program product downloadable from a communication network and/or stored on a machine readable medium comprising program code instructions for implementing the method referred to above.

BRIEF DESCRIPTION OF DRAWINGS

The above and other aspects of the invention will now be described, by way of example only, with reference to the accompanying drawings, in which.

Figure 1:
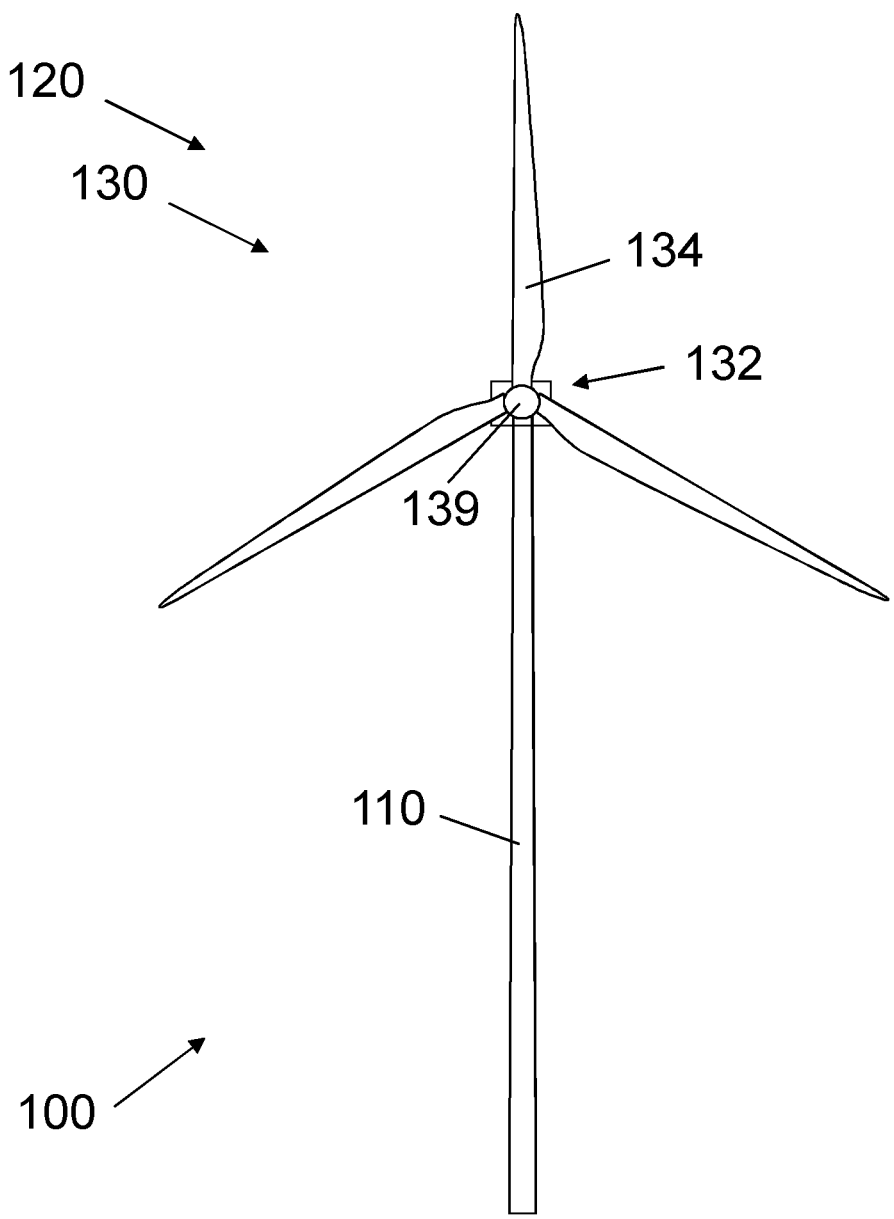
FIG. 1 is a schematic view of a single-rotor wind turbine.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised and structural, logical, and electrical changes may be made without departing from the scope of the invention as defined in the appended claims.

Figure 2:
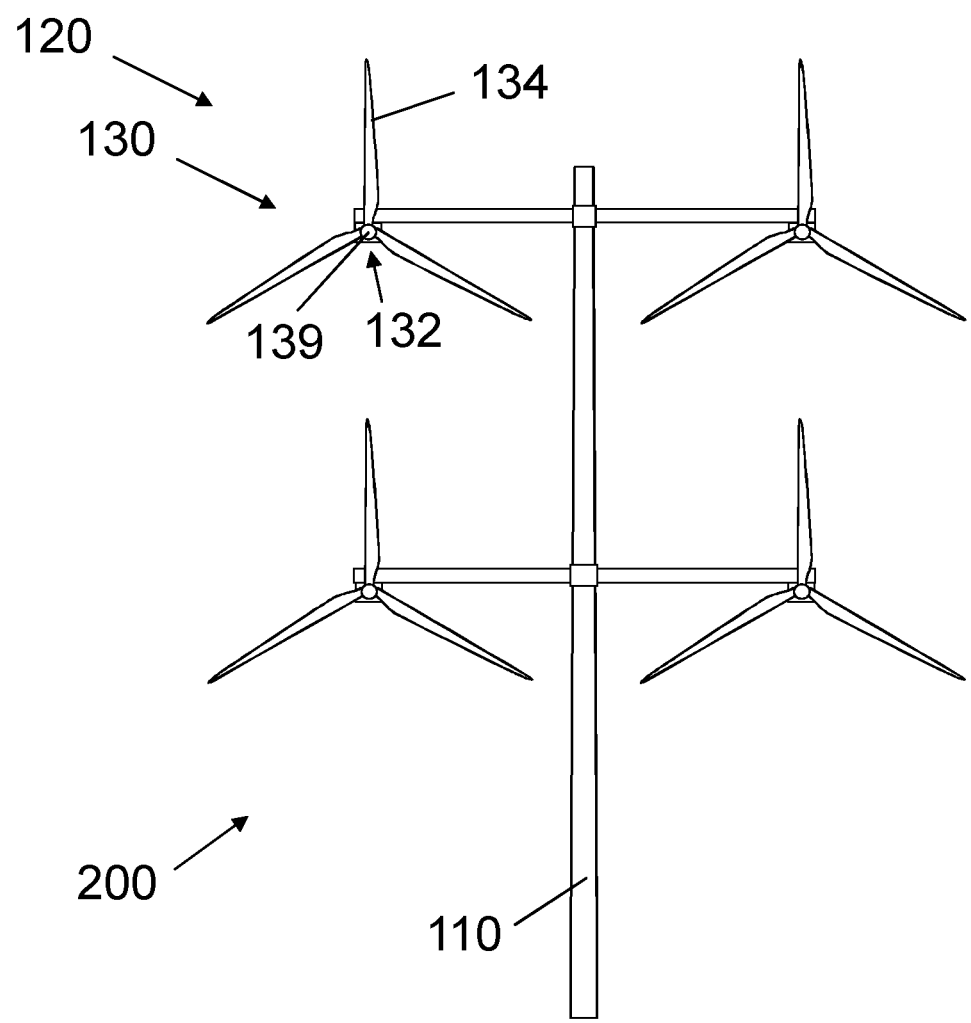
FIG. 2 is a schematic view of a multi-rotor wind turbine.

The invention concerns the operation of a single-rotor wind turbine 100 and a multi-rotor wind turbine 200, as shown in FIGS. 1 and 2 respectively, during a maintenance service.

Both wind turbines 100, 200 comprise a tower 110 arranged to support at least one rotor-nacelle assembly 120. As shown in FIG. 1, the single-rotor wind turbine 100 comprises one rotor-nacelle assembly 120, whereas the multi-rotor wind turbine 200 of FIG. 2 comprises a plurality of rotor-nacelle assemblies 120. In the example shown in FIG. 2, the mufti-rotor wind turbine 200 comprises four rotor-nacelle assemblies 120, although it will be apparent to the skilled reader that other configurations comprising fewer or more rotor-nacelle assemblies 120 are also possible. The tower 110 comprises an entrance-exit door (not shown) at the base thereof. The entrance-exit door is configured to permit access of personnel to the interior of the wind turbine 100, 200. The tower 110 further comprises an elevator (not shown), or lift, configured to transport personnel and cargo vertically within the wind turbine 100, 200.

Each rotor-nacelle assembly 120 comprises a rotor 130 and a nacelle 132 to which the rotor 130 is mounted. The rotor 130 comprises a plurality of rotor blades 134 radially extending from a central hub 139. In the examples shown in FIGS. 1 and 2, each rotor 130 comprises three rotor blades 134. In practice, however, the rotor 130 may comprise fewer or more rotor blades 134.

The rotor blades 134 are pitch-adjustable. That is, the pitch of the rotor blade 134 can be adjusted according to a pitch setting in order to change the thrust acting on the rotor blades 134, and hence the speed at which the rotor 130 is turned. The rotor 130 is operatively coupled to a generator 155 housed inside the nacelle 132.

Figure 3:
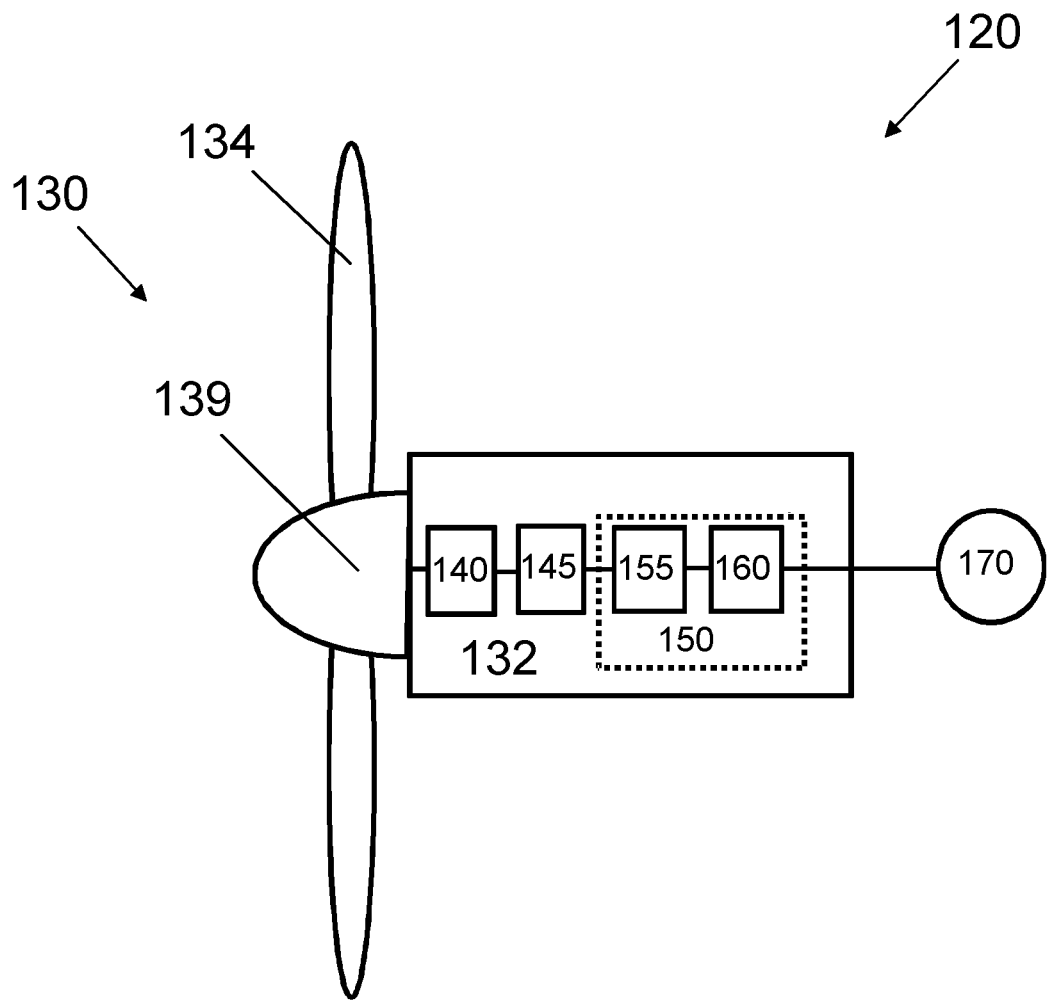
FIG. 3 is a schematic view of a rotor-nacelle assembly of the wind turbines of FIG. 1 and FIG. 2.

In addition to the generator 155, the nacelle 132 comprises miscellaneous components required for converting wind energy into electrical energy, along with various other components needed to operate, control, and optimise the performance of the wind turbines 100, 200. For example, with reference to FIG. 3, the nacelle 132 houses a bearing 140, a gearbox 145 and a power generation system 150 comprising the generator 155 and a power convertor system 160. The gearbox 145 gears up the rotational speed of the rotor 130 and drives the generator 155, which in turn feeds generated power to the power converter system 160. The power output of the power convertor system 160 is then transmitted to a load 170, which may be an electrical grid. The nacelle 132 further comprises an access panel (not shown) which is configured to allow personnel to gain access to its interior from the tower 110 for servicing and/or carrying out a suite of safety and diagnostic checks on the components housed within the nacelle 132.

During a service, the operation of the single-rotor and multi-rotor wind turbines 100, 200 is reduced so as to ensure the safety of the service personnel working thereon. In one embodiment, when personnel are present in the wind turbine 100, 200 as part of a service, the rotational speed of the or each rotor 130 and/or the power of the or each rotor-nacelle assembly 120 is reduced in accordance with a pre-determined strategy. For example, a pre-determined strategy may include reducing the rotational speed of the or each rotor and/or the power of the or each rotor-nacelle assembly 120 by a safety factor such as 10%.

If the mode of operation of a single-rotor or a multi-rotor wind turbine 100, 200 is not reduced during a service, the risk of injury to personnel is increased. For example, the development of resonant conditions in the tower 100 and overloading of the rotors 130 beyond their design capabilities are much more likely at full load. So as to mitigate the risk that such scenarios occur during a service, the single-rotor and multi-rotor wind turbines 100, 200 are operated at a reduced mode of operation in accordance with this invention.

When personnel are present in the vicinity of a particular rotor-nacelle assembly 120 so as to perform work on the rotor-nacelle assembly 120, the rotor-nacelle assembly 120 in question is typically brought to an idling mode or immobilised. For the single-rotor wind turbine 100, this results in the entire wind turbine 100 being brought to an idling mode or immobilised. In contrast, when one of the plurality of rotor-nacelle assembles 120 of the multi-rotor wind turbine 200 is brought to an idling mode or immobilised, the other rotor-nacelle assemblies 120 continue to operate at a reduced mode of operation. In doing so, the risk of harm on personnel working on or near the rotor-nacelle assembly 120 is mitigated.

The skilled person will appreciate that, so as to ensure the safety of service personnel working a rotor-nacelle assembly 120 of the multi-rotor wind turbine 200, it may sometimes be necessary to bring more than one rotor-nacelle assembly 120 to an idling mode or to immobilise more than one rotor-nacelle assembly 120. This is conceivable, for example, when working on a rotor-nacelle assembly 120 that is positioned immediately adjacent to another rotor rotor-nacelle assembly 120. In such an example, it may be necessary to bring both rotor-nacelle assemblies 120 to an idling mode or to immobilise both rotor-nacelle assemblies 120 so as to mitigate the risk of an uneven structural load distribution acting on the wind turbine 200.

By only bringing a rotor-nacelle assembly 120 to an idling mode or immobilising a rotor-nacelle assembly 120 when absolutely necessary during a service, i.e. only when the rotor-nacelle assembly 120 presents a safety risk to service personnel working on said rotor-nacelle assembly 120, it is possible to reduce losses, whether they be financial and/or operational losses, that are otherwise incurred during a conventional service where all rotor-nacelle assemblies 120 are brought to an idling mode or immobilised regardless of which part of the wind turbine 100, 200 is being serviced.

Figure 4:
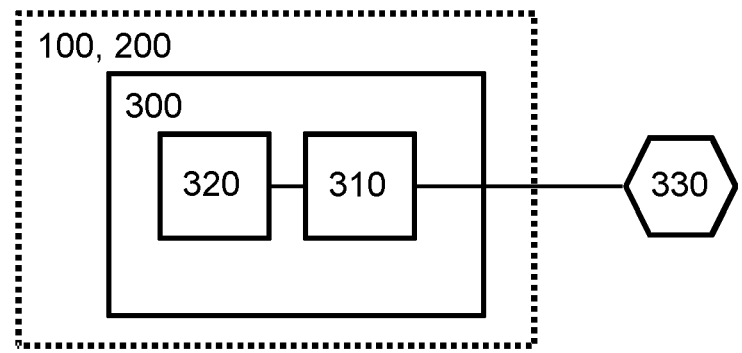
FIG. 4 is a schematic view of a controller of the wind turbines of FIG. 1 and FIG. 2; and, FIG. 5 is a schematic view of the controller of FIG. 3 and systems of the wind turbines of FIG. 1 and FIG. 2 with which the controller of FIG. 3 communicates.
Figure 5:
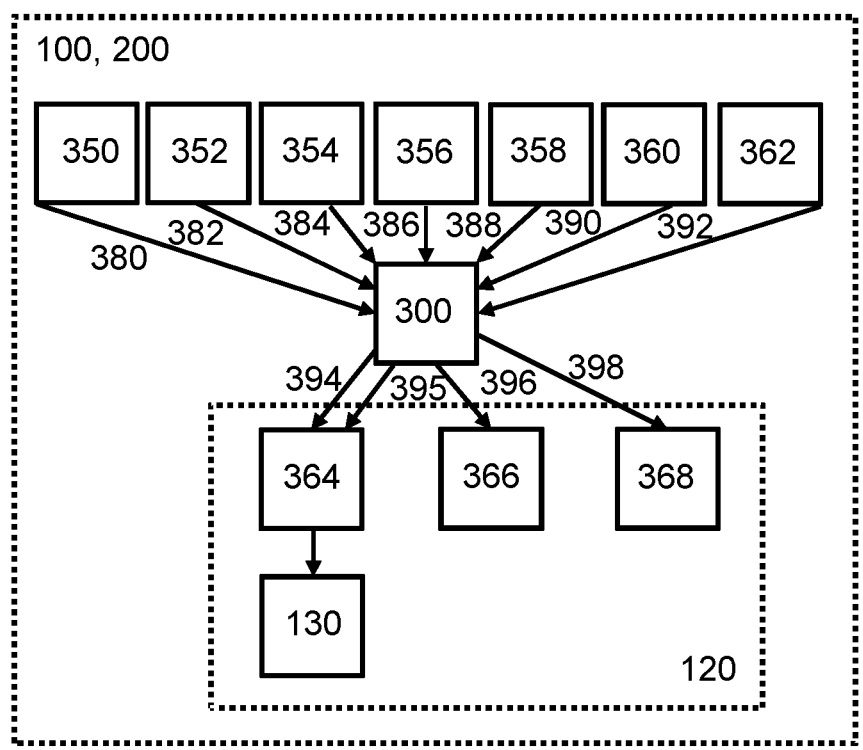

To control the operation of the or each rotor-nacelle assembly 120 during a service, the wind turbines 100 and 200 are each provided with a controller 300, as shown in FIGS. 4 and 5.

Referring to FIGS. 4 and 5, more detail about the controller 300 is now provided. Hereafter, the description is directed to a controller 300 of a multi-rotor wind turbine 200 having a plurality of wind turbine rotor-nacelle assemblies 120 as in FIG. 2. The skilled person, however, readily understands how the following considerations extend to a single-wind turbine 100.

As shown in FIG. 4, the controller 300 comprises a processor 310 configured to execute instructions that are stored in and read from a memory module 320 and/or an external data store that forms part of an external network 330. Data may also be stored in the memory module 320, and recalled in order to execute processes according to the instructions being carried out by the processor 310.

The controller 300 is in communication with a plurality of sensors and systems that are disposed about the wind turbine 200. For example, as shown in FIG. 5, the plurality of sensors and systems comprise one or more of the following:
- a mode-selection interface 350, at which a mode of operation of the wind turbine 200 may be changed;
- at least one movement sensor 352, which is positioned at at least one location in the wind turbine 200 and is configured to detect movement at the or each location;
- an elevator sensor 354, configured to detect presence of personnel in the elevator (not shown) of the wind turbine 200;
- an elevator interface 356, at which a destination for the elevator (not shown) of the wind turbine 200 is selected;
- at least one door sensor 358, which detects the opening of the entrance-exit door of the wind turbine 200 and/or the access panel of each nacelle 132 of the wind turbine 200;
- an assembly-select interface 360, at which a particular rotor-nacelle assembly 120 is selected to be worked on as part of a service;
- an at least one anemometer 362, which measures ambient wind speed around the wind turbine 200;
- a rotor-speed control means 364 of each rotor-nacelle assembly 120, which is configured to adjust the pitch of the rotor blades 134 of each respective rotor-nacelle assembly 120 so as to control the speed of the rotor 130;
- an overspeed protection system 366 of each rotor-nacelle assembly 120, which is configured prevent the rotor 130 of each rotor-nacelle assembly 120 from overspeeding; and,
- a vibration protection system 368 of each rotor-nacelle assembly 120, which is configured to prevent the rotor-nacelle assembly 120 from experiencing undesirable oscillatory movements.

In accordance with the invention, the controller 300 is configured to detect that a service is to be or is being carried out on the wind turbine 200, and, on detecting that a service is to be or is being carried out on the wind turbine 200, the controller 300 is configured to reduce the operating level of each rotor-nacelle assembly 120. That is, the controller 300 is configured to operate the wind turbine at a reduced operating level controller 300 during a service.

So as to detect that a service is to be or is being carried out on the wind turbine 200, the controller 300 is configured to detect one of more of: the selection of a maintenance operating mode, and the presence of personnel in the wind turbine 200.

To this end, the wind turbine 200 comprises the mode-selection interface 350 at which a maintenance worker, for example, selects a mode of operation for the wind turbine 200. One such mode of operation is a "service mode" which governs how the wind turbine 200 operates during a service. On selection of the "service mode", the mode-selection interface 350 is then configured to send a service-mode signal 380 to the controller 300, indicating that the wind turbine 200 is to undergo a service. On receiving service-mode signal 380, the controller 300 is configured to reduce the operating level of each rotor-nacelle assembly 120.

In order to detect the presence of personnel in the wind turbine 200, the controller 300 is configured to detect one or more of: the movement of personnel in the wind turbine 200, the operation of the elevator within the wind turbine 200, and that access has been gained to the interior of the wind turbine 200. The skilled person can conceive of many other ways of detecting the presence of personnel in the wind turbine 200 without departing from the scope of the invention as defined by the appended claims—for example, by detecting if a ladder hatch (not shown) in the wind turbine 200 has been used or by detecting light in the tower 110 of the wind turbine 200.

To detect the movement of personnel in the wind turbine 200, the wind turbine 200 is provided with the at least one movement sensor 352. In one embodiment, the at least one movement sensor 352 comprises a plurality of movement sensors 352 positioned throughout the turbine 200 and hence is configured to detect movement throughout the wind turbine 200. On detecting movement in the wind turbine 200, the at least one movement sensor 352 is configured to send a movement-detection signal 382 to the controller 300 indicating the presence of personnel in the wind turbine 200. On receiving a movement-detection signal 382, the controller 300 is configured to reduce the operating level of each rotor-nacelle assembly 120.

The elevator of the wind turbine 200 is configured to transport personnel and cargo from the base to the top of the tower 110. The elevator may be used by personnel during a service to reach the access panel of a rotor-nacelle assembly 120. The elevator comprises the elevator sensor 354, which is used to detect the presence of personnel in the elevator. The elevator sensor may 354, for example, be a load cell 354 which, when a particular weight threshold is exceeded, is configured to send an elevator-weight signal 384 to the controller 300 indicating the presence of personnel in the elevator. Additionally or alternatively, on selection of a destination at the elevator interface 356 in the elevator or on operation of the elevator, the elevator interface 356 is configured to send an elevator-operation signal 386 to the controller 300 indicating the presence of personnel in the elevator. On receiving an elevator-weight signal 384 and/or an elevator-operation signal 386 from the load cell 354 and/or the elevator interface 356, the controller 300 is configured to reduce the operating level of each rotor-nacelle assembly 120.

To detect that access has been gained to the interior of the wind turbine 200, the entrance-exit door at the base of the tower 110 and/or the access panel of each rotor-nacelle assembly 120 are provided with at least one door sensor 358.

The entrance-exit door at the base of the tower 110 is configured to permit access to the interior of the wind turbine 200, while the access panel of each rotor-nacelle assembly 120 is configured to permit access to the interior of each rotor-nacelle assembly 120. It is conceivable that there may be other doors within the wind turbine 200 that could also be provided with door sensors 358. The or each door sensor 358 is configured to detect when the entrance-exit door and/or the access panel is opened. On detecting the opening of the door and/or the access panel, the or each door sensor 358 sends a door-detection signal 388 to the controller 300 indicating presence of personnel in the wind turbine 200. On receiving a door-detection signal 388 from the door sensor 358, the controller 300 is configured to reduce the operating level of each rotor-nacelle assembly 120.

Having presented how the controller is configured to detect that a service is to be or is being carried out on the wind turbine 200, it shall now be detailed how the controller 300 is configured to reduce the operating level of each rotor-nacelle assembly 120 on detecting that a service is to be or is being carried out on the wind turbine 200.

To reduce the operating level of each rotor-nacelle assembly 120, the controller 300, on detecting that a service is to be or is being carried out on the wind turbine 200, is configured to derate the power of each rotor-nacelle assembly 120 and/or derate the speed of the rotor 130 of each rotor-nacelle assembly 120. The power of a rotor-nacelle assembly 120 is the amount of power that the rotor-nacelle assembly 120 is producing as the rotor 130 is driven by the wind. The speed of the rotor 130 is the speed at which the rotor 130 rotates when driven by the wind.

So as to derate the power of each rotor-nacelle assembly 120 and/or the speed of the rotor 130 of each rotor-nacelle assembly 120, the controller 300 is configured first to select a target power for each rotor-nacelle assembly 120 to derate to, the target power being less than the power generated by nominal operation of the wind turbine 200, and/or a target speed for the rotor 130 of each rotor-nacelle assembly 120 to derate to, the target speed of the rotor 130 being less than the rotational speed of the rotor during nominal operation of the wind turbine 200.

Before proceeding with derating the power of each rotor-nacelle assembly 120 and/or the speed of the rotor 130 of each rotor-nacelle assembly 120, the controller 300 is first configured to check if the selected target power and/or target speed is "acceptable", i.e. that the selected target power and/or the target speed will not result in exciting forces acting on the tower 110 and/or the rotor-nacelle assembly 120, which could lead to the development of resonant condition. In one embodiment, the controller 300 is configured to determine whether a projected rotational frequency of each rotor 130, the projected rotational frequency being based on the target power and/or target speed of rotor 130, coincides with a whirling mode frequency of the rotor blades 134 of each rotor 130 and, in the case where the projected rotational frequency does coincide with a whirling mode frequency of the rotor blades 134, to reduce the target power and/or target speed until the rotational frequency associated with the reduced target no longer coincide with the whirling mode frequency of the rotor blades 134.

Before providing details on how the controller is configured to determine whether the projected rotational frequency of the rotor 130 coincides with the whirling frequency of a rotor blade 134, an overview of "whirling", its disadvantages, and how the whirling mode frequency of a rotor blade 13 may be calculated is first presented.

When a rotor 130 of a rotor-nacelle assembly 120 is turning, oscillations of the rotor blades 134 along their edgewise axis, which extend generally through the leading and trailing edges of the rotor blades 134, can cause movement of the rotor blades 134 in the same plane as the plane of rotation of the rotor 130. Since edgewise oscillations of the rotor blades 134 excite the rotor 130 with a force that is transverse to its longitudinal axis, in resonant conditions this may result in the rotational axis of the rotor shaft (not shown) describing an erratic pattern of motion. This phenomenon is known as 'whirling'.

This complex pattern of motion of the rotor 130 is the result of two circularly rotating force vectors that are generated by the combined oscillatory behaviour of the rotor blades 134. A first force vector rotates in the same rotational direction as the rotor 130 but at a higher frequency (progressive force vector), and a second force vector that rotates in a direction opposite to that of the rotor 130 and at a lower frequency (regressive force vector). The result of the progressive and regressive force vectors is a force vector that traces an elliptical path, when viewed in a rotating reference frame aligned with the rotor 130. This can impart lateral forces to the nacelle 132 via the rotor 130 and therefore causes it to oscillate in the lateral direction.

The phase difference between the edgewise oscillations of the blades 134 determines whether whirling occurs in the same rotational direction as the rotor 130, which is generally known as forward whirl or 'forward whirling mode', or whether whirling occurs in the opposite rotational direction to that of the rotor 130, which is generally known as backward whirl or 'backward whirling mode'.

The frequency of the edgewise oscillations may be calculated using a number of techniques. For example, it may be calculated based on structural models of the specific rotor blade 134 used on the wind turbine 200 or it may be determined by way of subjecting that specific rotor blade 134 to a testing procedure designed to identify the natural edgewise frequency (eigenfrequency) of the blade 134.

In an embodiment, the whirling mode frequency is mapped based on the frequency of the edgewise oscillations and the rotational frequency of the rotor 130. The mapping of the edgewise oscillations to forward and backward whirling mode frequencies is envisaged to be a subtraction and addition of the two component frequencies, i.e. the backward whirling mode frequency is calculated by subtracting the rotational frequency from the edgewise frequency, and the forward whirling mode frequency is calculated by the addition of the rotational frequency and the edgewise frequency. The mapping of higher order modes is also envisaged. The forward and backward whirling mode frequencies can then be stored and recalled from the memory module 320 and/or the external network 330.

In another embodiment, the whirling mode frequencies are determined indirectly by measuring a component of tower 110 and/or nacelle 132 acceleration in the lateral direction.

Having explained how the whirling mode frequency of a rotor blade 130 may be calculated, it shall now be detailed how the controller 300 is configured to the check if a selected target power and/or target speed should result in whirling of the rotor blades 134 of each rotor 130.

After the whirling mode frequency of a rotor 130 is determined, the controller 300 is configured to determine an upper whirling mode frequency threshold and a lower whirling mode frequency threshold for the rotor blade 134 based on the determined whirling mode frequency of a rotor 130. The upper and lower whirling mode frequency thresholds define an avoidance zone around the determined whirling mode frequency. The controller is configured to ensure that the projected rotational frequency of each rotor 130 does not fall within the avoidance zone.

To this end, the controller 300 is first configured to determine if the projected rotational frequency falls within the avoidance zone. If the projected rotational frequency of the rotor 130 does fall within the avoidance zone, the controller is configured to reduce the target power of each rotor-nacelle assembly 120 and/or target speed of the rotor 130 of each rotor-nacelle assembly 120 until the projected rotational frequency associated with the reduced target power and/or reduced target speed of the rotor 130 falls outside the avoidance zone.

In the case where the projected rotational frequency is determined to lie outside the avoidance zone, the controller 300 is configured to determine that the selected target power and/or target speed is "acceptable" since it is unlikely that the selected target power and/or target speed will result in whirling for the rotor blade 134. On determining that the selected target power and/or target speed is "acceptable", the controller 300 is configured then to send a target-power signal 394 identifying the "acceptable" selected target power and/or a target-speed signal 395 identifying the "acceptable" selected target speed to the rotor-speed control means 364.

On reception of the target-power signal 394 and/or the target-speed signal 395, the rotor-speed control means 364 of each rotor-nacelle assembly 120 is configured to adjust the pitch of the rotor blades 134 based on the "acceptable" selected target power and/or the "acceptable" selected target speed, reducing the thrust acting on the rotor blade 134. As a consequence, the speed of the rotor 130 of each rotor-nacelle assembly 120 is reduced. The power of each rotor-nacelle assembly 120 and/or the speed of the rotor 130 of each rotor-nacelle assembly 120 is derated until the selected target power is attained.

In addition to reducing the operating level of each rotor-nacelle assembly 120 on detecting that a service is to be or is being carried out on the wind turbine 200, the controller 300 is further configured to adjust at least one protection system of each rotor-nacelle assembly 120. The or each protection system is configured to monitor the operation of the wind turbine 200 in some way so as to mitigate the risk of damage to the wind turbine. The or each protection system comprises at least one of an overspeed protection system 366 of each rotor-nacelle 120, a vibration protection system 368 of each rotor-nacelle assembly 120, a power protection system (not shown) of each rotor-nacelle assembly, 120 an acceleration protection system (not shown) of the tower 110 and a blade pitch protection system (not shown) of each rotor-nacelle assembly 120. So as to adjust the or each protection system, the controller 300, on detecting that a service is to be or is being carried out on the wind turbine 200, is configured to send at least one protection system signal (not shown) to the or each protection system.

The overspeed protection system 366 of each rotor-nacelle assembly 120 is configured to observe the speed of the rotor 130 of each rotor-nacelle assembly 120 and bring the respective rotor-nacelle assembly 120 to an idling mode or immobilise the respective rotor-nacelle assembly 120 when overspeeding of the rotor 130 is detected. To this end, the overspeed protection system 386 of each rotor-nacelle assembly 120 is configured to prevent the speed of the rotor 130 from exceeding an overspeed threshold. On reception of an overspeed signal 396 sent by the controller 300 the overspeed protection system 366 of each rotor-nacelle assembly 120 is configured to reduce the overspeed threshold of the rotor 130 of the respective rotor-nacelle assembly 120.

The vibration protection system 368 of each rotor-nacelle assembly 120 is configured to measure a vibrational movement of each rotor-nacelle assembly 120 and to bring the respective rotor-nacelle assembly 120 to an idling mode or immobilise the respective rotor-nacelle assembly 120 when too much vibration is detected. Such vibrational movements may come about, for example, as a result of mass and/or aerodynamic imbalances in the rotor 130 and may be measured using a sensor, such as an accelerometer, either mounted within the nacelle 132 or located towards the top of the tower 110. To this end, the vibration protection system 368 of each rotor-nacelle assembly 120 is configured to prevent the vibrational movement of each rotor-nacelle assembly 120 from exceeding a vibration threshold. On reception of a vibration signal 398 sent by the controller 300 the vibration protection system 368 of each rotor-nacelle assembly 120 is configured to reduce the vibration threshold of the respective rotor-nacelle assembly 120.

Likewise, the power protection system (not shown) is configured to prevent each rotor-nacelle 120 assembly from overworking, the acceleration protection system (not shown) is configured to prevent an unacceptable level of vibrational movement of the tower 110 and the blade pitch protection system (not shown) of each rotor-nacelle assembly 120 is configured to prevent the rotor-speed control means 364 from arranging the blades 134 of the rotor 130 of each rotor-nacelle assembly 120 such that the load on the rotor is increased undesirably. To this end, the power protection system is configured to prevent the power of each rotor-nacelle assembly 120 from exceeding a overpower threshold, the acceleration protection system is configured to prevent the vibrational movement of the tower 110 from exceeding an acceleration threshold and the blade pitch protection system is configured to prevent the blades 134 of the rotor 130 of each rotor-nacelle assembly 120 being adjusted beyond a pitch threshold. On reception of a protection system signal sent by the controller 300, the power protection system, the acceleration protection system and the pitch protection system are configured to reduce the overpower threshold of each rotor-nacelle assembly 120, to reduce the acceleration threshold of the tower 110 and increase the blade pitch threshold of each rotor-nacelle assembly 120 respectively. By increasing the blade pitch threshold, the lower limit of the pitch angle is increased. Such lower limit may e.g. be defined by a thrust limit of rotor.

By mitigating the risk of the rotor 130 overspeeding or the rotor-nacelle assembly 120 or tower 110 from experiencing an undesirable level of vibrational movement, the risk of harm on personnel working on the wind turbine 200 during a service is mitigated.

In the case where the speed of the rotor 130 of each rotor-nacelle assembly 120 is derated and the overspeed threshold is reduced, the controller 300 is beneficially configured, so as to accrue further safety benefits, to derate the speed of the rotor 130 of each rotor-nacelle assembly 120 or the power of each rotor-nacelle assembly 120 comparatively less than the amount by which the overspeed or overpower threshold is reduced.

Detail will now be provided on how the controller 300 controls the operation of the wind turbine 200 during maintenance on a particular rotor-nacelle assembly 120 during a service.

In order to protect personnel carrying out maintenance on a specified rotor-nacelle assembly 120, it is often beneficial to change the operation of the specified rotor-nacelle assembly 120 beyond derating.

As such, the controller 300 is configured to detect that a service is to be or is being carried out on a specified rotor-nacelle assembly 120 of the wind turbine 200, and, on detecting that a service is to be or is being carried out on the specified rotor-nacelle assembly 120, is configured to inhibit a system associated with the specified rotor-nacelle assembly 120.

To detect that a service is to be or is being carried out on a rotor-nacelle assembly 120 of the wind turbine 200, the controller 300 is configured to detect the selection of a rotor-nacelle assembly 120 for service and/or by detecting the presence of personnel in the vicinity of a rotor-nacelle assembly 120.

To this end, the wind turbine 200 comprises the assembly-select interface 360 at which a maintenance worker, for example, selects which rotor-nacelle assembly 120 they are to perform maintenance on. On selection of a rotor-nacelle assembly 120 at the assembly-selection interface 360, the assembly-select interface 360 is configured to send an assembly-selection signal 290 to the controller 300 indicating which rotor-nacelle assembly 120 is to undergo a service. On receiving an assembly-selection signal 290 from assembly-select interface 360, the controller 300 is configured to inhibit a system associated with the selected rotor-nacelle assembly 120.

In order to detect the presence of personnel in the vicinity of a rotor-nacelle assembly 120, the controller 300 is configured to detect the movement of people in the vicinity of the rotor-nacelle assembly 120, to detect the operation of an elevator in the vicinity of the rotor-nacelle assembly 120, and/or detect that access has been gained within the vicinity of the rotor-nacelle assembly 120. The controller 300 does this in the same way as detecting the presence of personnel in the wind turbine 200, as described above, but by limiting the surveillance area of the sensors to the vicinity of a rotor-nacelle assembly 120. It will be appreciated by the skilled person can conceive of many other ways of detecting the presence of a person in the vicinity of a rotor-nacelle assembly 120 without departing from the scope of the invention as claimed in the claims.

Inhibiting a system associated with the specified rotor-nacelle assembly 120 may include bringing the specified rotor-nacelle assembly 120 to an idling mode or immobilising the specified rotor-nacelle assembly 120. The skilled person can conceive of many other ways of inhibiting a system associated with the specified rotor-nacelle assembly 120 so as to ensure the safety of the workers working thereon without departing from the scope of the invention as claimed in the claims.

While one of the rotor-nacelle assemblies 120 is brought to an idling mode or immobilised during its service, the others 120 remain operational at a derated state. As such, the wind turbine 300 may still produce electricity while maintaining safety during a service.

If the wind speed increases during a service on the wind turbine 200, it may become unsafe to work on the wind turbine 200 while any of the rotor-nacelle assemblies 120 are operating. In response to this, the controller 300 is configured to monitor ambient wind speed. To this end, the wind turbine 200 comprises at least one anemometer 362 which is configured to measure ambient wind speed. The at least one anemometer 362 is further configured to send an ambient wind speed signal 392 indicating the measured ambient wind speed to the controller 300. On reception of the ambient wind speed signal 392, the controller 300 is configured to determine a wind speed based on the measured ambient wind speed. The controller 300 is further configured to determine whether the wind speed exceeds a predetermined wind speed threshold. On determining that the wind speed exceeds a wind speed threshold, the controller 300 is configured to bring the rotor 130 of all rotor-nacelle assemblies 12 to an idling mode or to immobilise the rotor 130 of all rotor-nacelle assemblies 120.

It will be appreciated by those skilled in the art that the invention has been described by way of example only, and that a variety of alternative approaches may be adopted without departing from the scope of the invention, as defined by the appended claims.

The invention claimed is:

1. A method of operating a wind turbine during a service, wherein the wind turbine comprises a rotor-nacelle assembly comprising a rotor, the method comprising:
   detecting, based on data from one or more sensors embedded within a wind turbine, that a service is to be or is being carried out on the rotor-nacelle assembly of the wind turbine by detecting a selection of the rotor-nacelle assembly for service, and detecting a presence of personnel in a vicinity of the rotor-nacelle assembly; and
   on detecting that the service is to be or is being carried out on the rotor-nacelle assembly:
      reducing an operating level of the rotor-nacelle assembly; and
      reducing an overspeed threshold or an overpower threshold of the rotor by an amount greater than an amount by which the operating level of the rotor-nacelle assembly is reduced.

2. The method of claim 1, further comprising:
   on detecting that the service is to be or is being carried out on the rotor-nacelle assembly, inhibiting a system associated with the rotor-nacelle assembly.

3. The method of claim 2, wherein detecting the presence of personnel in the vicinity of the rotor-nacelle assembly comprises detecting movement of personnel in the vicinity of the rotor-nacelle assembly.

4. The method of claim 2, wherein inhibiting a system associated with the rotor-nacelle assembly comprises bringing to an idling mode or immobilising the rotor-nacelle assembly.

5. The method of claim 2, wherein detecting the presence of personnel in the vicinity of the rotor-nacelle assembly comprises detecting the operation of an elevator in the vicinity of the rotor-nacelle assembly.

6. The method of claim 2, wherein detecting the presence of personnel in the vicinity of the rotor-nacelle assembly comprises detecting that access has been gained to the rotor-nacelle assembly.

7. The method of claim 1, wherein detecting that the service is to be or is being carried out on the rotor-nacelle assembly comprises one or more of: detecting the selection of a maintenance operating mode of the wind turbine, and detecting the presence of personnel in the wind turbine.

8. The method of claim 7, wherein detecting the presence of personnel in the wind turbine comprises one or more of: detecting movement of personnel in the wind turbine, detecting the operation of an elevator in the wind turbine, and detecting that access has been gained to an interior of the wind turbine.

9. The method of claim 1, wherein reducing an operating level of the rotor-nacelle assembly comprises derating at least one of a power of the rotor-nacelle assembly or a speed of the rotor.

10. The method of claim 1, further comprising, on detecting that the service is to be or is being carried out on the rotor-nacelle assembly, one or more of: reducing a vibration threshold of the rotor-nacelle assembly, reducing an acceleration threshold of a tower of the wind turbine, or increasing a blade pitch threshold of the rotor.

11. The method of claim 9, wherein derating at least one of a power of the rotor-nacelle assembly or a speed of the rotor of the rotor-nacelle assembly comprises:
  selecting at least one of a target power for the rotor-nacelle assembly or a target speed for the rotor;
  determining a rotational frequency of the rotor corresponding to the target power or target speed;
  determining a whirling mode frequency of a rotor blade of the rotor;
  determining an upper whirling mode frequency threshold and a lower whirling mode frequency threshold for the rotor blade based on the determined whirling mode frequency, the upper and lower thresholds defining an avoidance zone;
  determining whether the rotational frequency falls within the avoidance zone;
  on determining that the rotational frequency falls outside the avoidance zone, at least one of (i) derating the power of the rotor-nacelle assembly to the target power or (ii) derating the speed of the rotor of the rotor-nacelle assembly to the target speed; and
  on determining that the rotational frequency falls within the avoidance zone, (i) reducing at least one of the target power or the target speed until the rotational frequency associated with the reduced target power or the reduced target speed falls outside the avoidance zone and (ii) derating the power of the rotor-nacelle assembly to the reduced target power or derating the speed of the rotor of the rotor-nacelle assembly to the reduced target speed.

12. The method of claim 1, further comprising:
  monitoring ambient wind speed;
  determining a wind speed based on the ambient wind speed;
  determining whether the wind speed exceeds a wind speed threshold; and
  on determining that the wind speed exceeds a wind speed threshold, bringing to an idling mode or immobilising the rotor.

13. A controller for a wind turbine control system comprising a processor and a memory module, wherein the memory module comprises a set of program code instructions which when executed by the processor configures the processor to:
  (a) detect, based on data from one or more sensors embedded within a wind turbine, that a service is to be or is being carried out on a rotor-nacelle assembly of the wind turbine by:
    (i) detecting a selection of the rotor-nacelle assembly for service; and
    (ii) detecting a presence of personnel in a vicinity of the rotor-nacelle assembly; and
  (b) based on the detection that a service is to be or being carried out:
    (i) reduce an operating level of the rotor-nacelle assembly; and
    (ii) reduce an overspeed threshold or an overpower threshold of a rotor of the rotor-nacelle assembly by an amount greater than an amount by which the operating level of the rotor-nacelle assembly is reduced.

14. The controller of claim 13, wherein, on detecting that the service is to be or is being carried out on the rotor-nacelle assembly, the processor is further configured to at least one of:
  (1) adjust at least one protection system of the rotor-nacelle assembly; or
  (2) inhibit a system associated with the rotor-nacelle assembly.

15. The controller of claim 13, wherein, detecting the presence of personnel in the vicinity of the rotor-nacelle assembly comprises one or more of: detecting movement of personnel in the vicinity of the rotor-nacelle assembly, detecting the operation of an elevator in the vicinity of the rotor-nacelle assembly, and detecting that access has been gained to the rotor-nacelle assembly.

16. A computer program product downloadable from a communication network and/or stored on a machine readable medium comprising program code instructions which, when executed by one or more processors, configure the one or more processors to:
  (a) detect, based on data from one or more sensors embedded within a wind turbine, that a service is to be or is being carried out on a rotor-nacelle assembly of the wind turbine by:
    (i) detecting a selection of the rotor-nacelle assembly for service; and
    (ii) detecting a presence of personnel in a vicinity of the rotor-nacelle assembly; and
  (b) based on the detection that a service is to be or being carried out:
    (i) reduce an operating level of the rotor-nacelle assembly; and
    (ii) reduce an overspeed threshold or an overpower threshold of a rotor of the rotor-nacelle assembly by an amount greater than an amount by which the operating level of the rotor-nacelle assembly is reduced.

17. A wind turbine, comprising:
  a tower;
  a rotor-nacelle assembly comprising a nacelle and a rotor extending from the nacelle;
  a plurality of blades disposed on the rotor;
  a wind turbine control system comprising a processor and a memory module, wherein the memory module comprises a set of program code instructions which when executed by the processor configures the processor to:
    (a) detect, based on data from one or more sensors embedded within a wind turbine, that a service is to be or is being carried out on the rotor-nacelle assembly by:
      (i) detecting a selection of the rotor-nacelle assembly for service; and
      (ii) detecting a presence of personnel in a vicinity of the rotor-nacelle assembly; and
    (b) based on the detection that a service is to be or being carried out:
      (i) reduce an operating level of the rotor-nacelle assembly; and
      (ii) reduce an overspeed threshold or an overpower threshold of the rotor by an amount greater than an amount by which the operating level of the rotor-nacelle assembly is reduced.

18. The wind turbine of claim 17, wherein, detecting the presence of personnel in the vicinity of the rotor-nacelle assembly comprises one or more of: detecting movement of personnel in the vicinity of the rotor-nacelle assembly, detecting the operation of an elevator in the vicinity of the rotor-nacelle assembly, and detecting that access has been gained to the rotor-nacelle assembly.

\* \* \* \* \*